United States Patent [19]

Humpe

[11] Patent Number: 4,634,145
[45] Date of Patent: Jan. 6, 1987

[54] TRUCK TRAILER LOADING BRIDGE ASSEMBLY

[76] Inventor: Gilbert Humpe, 155 E. Main St., Hopedale, Ohio 43976

[21] Appl. No.: 793,843

[22] Filed: Nov. 1, 1985

[51] Int. Cl.⁴ ............................. B60P 1/00; B60R 9/04
[52] U.S. Cl. ..................................... 280/769; 14/69.5; 105/422; 280/770; 296/188
[58] Field of Search ................ 296/188, 189; 280/769, 280/770, 669; 105/422, 375; 14/69.5, 71.3; 414/537, 911

[56] References Cited

U.S. PATENT DOCUMENTS

| | | | |
|---|---|---|---|
| 1,568,303 | 1/1926 | Webster | 14/69.5 |
| 3,870,170 | 3/1975 | Noble et al. | 14/69.5 |
| 4,078,678 | 3/1978 | Tordella | 14/69.5 |
| 4,551,877 | 11/1985 | Alten | 14/71.3 |

Primary Examiner—Richard A. Bertsch
Attorney, Agent, or Firm—Shlesinger Arkwright Garvey & Fado

[57] ABSTRACT

A truck trailer bridge assembly for use with a truck trailer having at least a first area directly supported by at least one axle and a second area directly supported by at least one axle, the bridge assembly comprises a base portion extending from the truck trailer first axle area to the truck trailer second axle area, a plurality of support beams generally extending from the truck trailer first axle area to the truck trailer second axle area, a central plate supported by the support beams, a first end angled plate supported by the support beams, a second end angled plate supported by the support beams, and a lift engagement support plate secured to the support beams and adapted for engaging a mechanical lift so that the bridge section may be positioned as desired.

10 Claims, 9 Drawing Figures

TRUCK TRAILER LOADING BRIDGE ASSEMBLY

BACKGROUND OF THE INVENTION

The transportation of extremely heavy items presents many problems with respect to the strength of the container or vessel which carries the heavy object during the transportation. For example, steel cord is used extensively in construction to reinforce concrete or the like. The transportation of such steel cord is difficult considering the extreme weight of a steel cord coil.

Truck trailers specially designed to carry heavy loads are available. However, these truck trailers may be unreasonably expensive, dependent upon the number of times they are actually used to carry heavy loads.

In the past, steel cord coils could only be moved by truck if the truck in question was employing a truck trailer which had no cover. Covered truck trailers could not be used because, as a coil was moved from the rear end of the truck trailer to the front end, above the front wheel axles, the great weight of the steel coil would cause structural damage to the trailer truck bed. In fact, the portion in between the areas above the front and rear wheel axles, of the average trailer truck, cannot support the weight of a steel coil as it is brought over such portion to be loaded. A great disadvantage of employing a truck trailer having no cover is that the steel coils being shipped are continuously exposed to the elements. This exposure causes significant damage to the steel coil.

It is known in the cargo transportation art to use planks or some other type of cantilever bridge span to move cargo from a location where it is being stored into the container or vessel which is to transport the cargo. For example, U.S. Pat. No. 426,209 issued Apr. 22, 1890 to McIntyre teaches a gang plank for transportation of cargo or the like between a loading dock and a vessel. U.S. Pat. No. 1,568,303 issued Jan. 5, 1926 to Webster teaches freight skids which are used in loading and unloading railroad cars and trucking freight to and from floors or platforms at different elevations.

U.S. Pat. No. 571,497 issued Nov. 17, 1896 to Powell teaches a platform which may be inserted within a freight car. The platform carries a gang-plank within a central longitudinal chamber. The purpose and effect of the Powell platform and gangplank is to provide a freight car floor having a gang-plank which can be easily employed in that it is easy to access without disturbing the freight lying on the freight car floor. This device, as other devices of the prior art, teach means for effecting the transportation of cargo from a storage location to a container or vessel over some sort of gap. However, the prior art appears to be silent relative to the problem of transportation of heavy cargo over structurally weak portions within a container or vessel.

OBJECTS AND SUMMARY OF THE INVENTION

It is an object of the present invention to provide a portable bridge section for use within a truck trailer or the like to move heavy cargo within the truck trailer without damaging weaker portions of the truck trailer bed.

Another object of the present invention is to provide a portable bridge section, for use within a truck trailer to distribute weight evenly as heavy cargo is loaded within the trailer, which may be easily moved and positioned within a truck trailer.

Still another object of the present invention is to provide a bridge section for transporting heavy cargo within a truck trailer which is relatively light weight but structurally strong.

Another object of the present invention is to provide a portable bridge section provided with a lift engagement means for allowing the bridge section to be engaged by a fork lift or the like so as to provide a convenient means to move the bridge section.

Another object of the present invention is to enable a standard truck trailer to handle heavy loads.

A further object of the invention is to provide a truck trailer bridge assembly which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
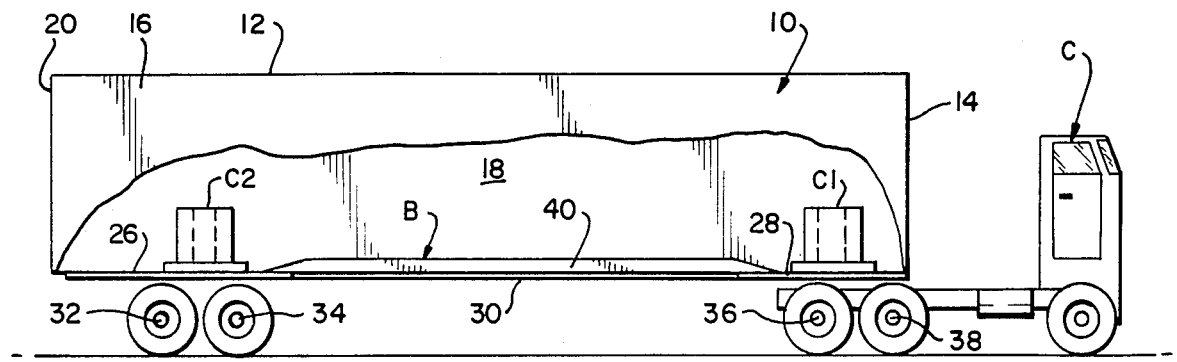
FIG. 1 is a schematic drawing of a truck with a removable truck trailer bridge assembly positioned within the truck trailer.

Referring to FIG. 1 in particular, there is shown a covered tractor trailer generally designated 10 including a covered portion having a top panel 12, a front portion 14, a right side panel 16, a left side panel 18 and a rear access portion 20. The covered tractor trailer 10 includes a first area or reinforcing plate 26 directly supported by at least one axle and a second area or reinforcing plate 28 directly supported by at least one axle. The first area 26 and second area 28 form part of a tractor trailer bed 30. Beneath the first area 26 supported by at least one axle there are typically two axles 32 and 34 having wheels associated therewith. These axles 32 and 34 directly support the rear portion of the tractor trailer 10. The second area 28 supported by at least one axle is supported by axles 36 and 38 which are associated with a truck cab generally designated C. Truck cab axles 36 and 38 have wheels associated therewith.

The region 40 of the tractor trailer bed 30 which is between the first area 26 and the second area 28 is structurally weaker than areas 26 and 28. For example, to place a coil C1 above the second supported area 28, the coil must be moved across the weaker region 40. Given a typical tractor trailer 10 the movement of a coil C1 over the unsupported area 40 would cause severe structural damage to the unsupported area 40 and possibly would result in area 40 collapsing. As mentioned above, the solution of the prior art to this problem is to transport only one coil C2 by positioning C2 above the first area 26 supported by at least one axle.

Alternatively, two coils may be transported by using a tractor trailer which is not covered, thereby enabling both coils C1 and C2 to be appropriately loaded on the tractor trailer bed.

Figure 2:
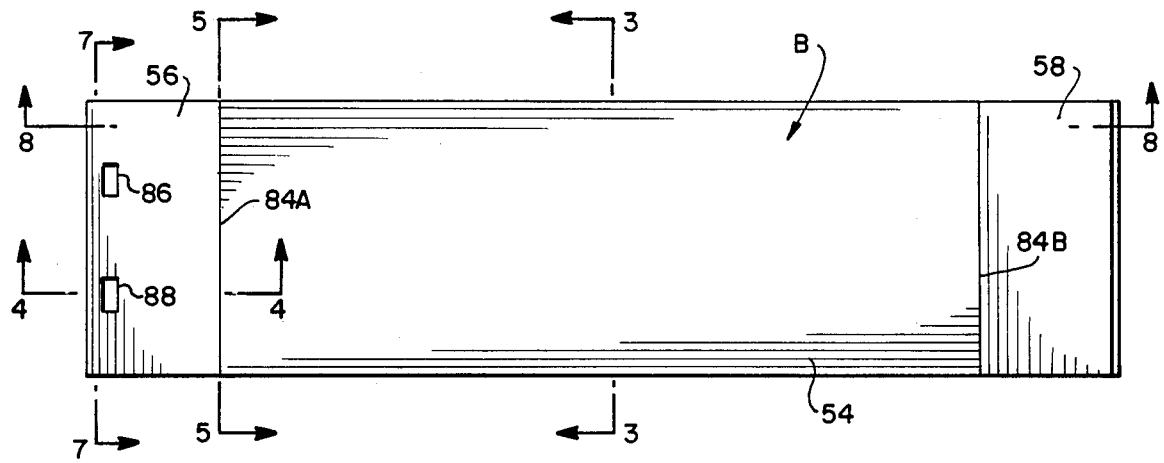
FIG. 2 is a top plan view of a truck trailer bridge assembly according to the invention.
Figure 3:
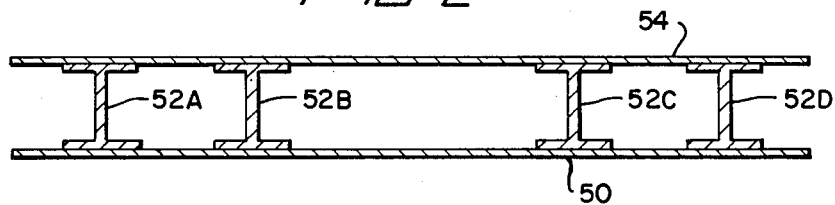
FIG. 3 is a cross-section of a truck trailer bridge assembly taken along line 3—3 of FIG. 2.
Figure 4:
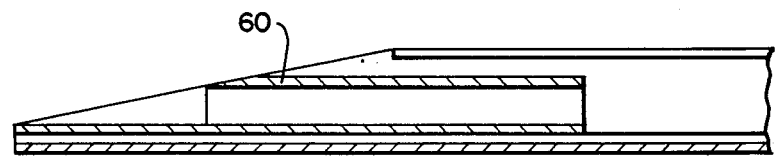
FIG. 4 is a cross-section of a truck trailer bridge assembly taken along line 4—4 of FIG. 2.
Figure 5:
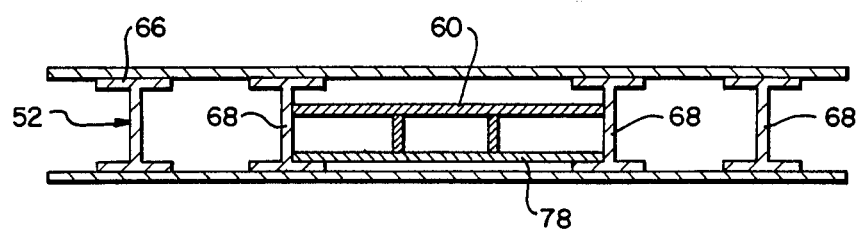
FIG. 5 is a cross-section of a truck trailer bridge assembly taken along line 5—5 of FIG. 2.
Figure 6:
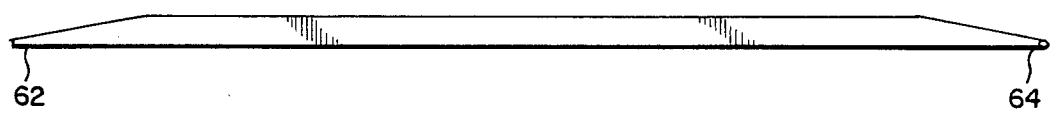
FIG. 6 is a side view of the truck trailer bridge assembly according to the invention.
Figure 7:
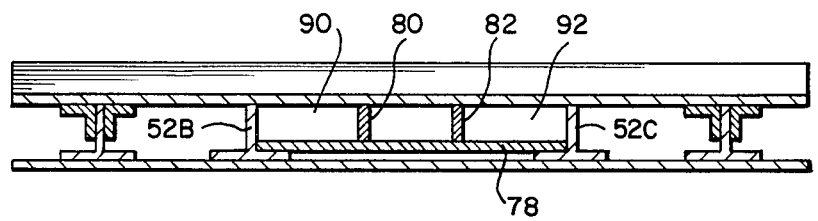
FIG. 7 is a cross-section of a truck trailer bridge assembly taken along 7—7 of FIG. 2.
Figure 8:
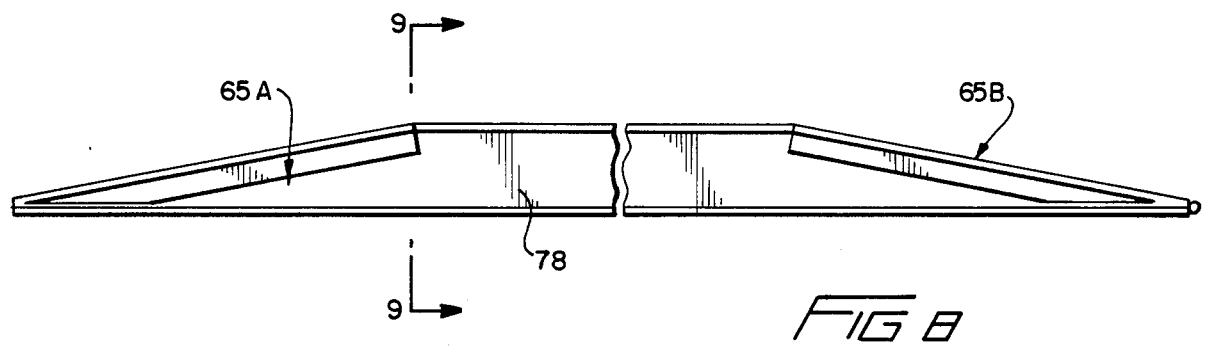
FIG. 8 is a cross-section taken along line 8—8 of FIG. 2.
Figure 9:
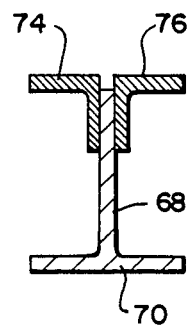
FIG. 9 is a section taken line 9—9 of FIG. 8.

Referring to FIGS. 2, 3 and 4 in particular, there is shown a tractor trailer bridge assembly generally designated B including a base plate 50, support beams 52, central supported plate 54, a first angled supported plate 56, a second angled supported plate 58 and a lift engagement support plate 60.

Base plate 50 is designed to be approximately 7 feet wide and 27 feet long so that it can effectively distribute weight over a large portion of the tractor trailer bed 30. By use of such a base plate 50, the non-supported area 40 is partially bridged so that base plate 50 overlaps the first area 26 supported by axles and the second area 28 supported by axles.

A plurality of support beams 52 are positioned so as to extend lengthwise above the base plate 50. In the preferred embodiment four I beam members 52A, 52B, 52C and 52D extend from approximately a first end 62 of base portion 50 to a second end 64 of base portion 50. Each of the support beams 50A through D is tapered or is cut off in a region 65A and 65B each approximately 3½ feet from respective ends of the base portion. In other words, the top portion 66 of each of the I beam members 52A through D is removed adjacent ends 62 and 64 of the base portion. The central portion 68 of each of the I beam members 52A through D is configured so as to have a constant slope from a line which is 3½ feet from the end of the base portion, where the taper (slope) of the support beam starts, to the end of the base portion at which point the central part 68 of the I beam 52 extends only a short distance from a base portion 70 of the I beam 52. In the taper region of each of the support beams or I beams 52A through D there is provided a first angle section 74 and a second angle section 76. Angled sections 74 and 76 are provided to give an upper support surface for each of the support beams in the tapered region 65.

In the region where the support beams 52A through D are not tapered or central region 78, the central supported plate 54 rests on the top part 66 of I beams 52A, 52B, 52C and 52D. The central supported plate 54 is 7 feet wide corresponding to the width of the base plate and is preferably 20 feet in length—leaving 3½ feet at each end for the tapered regions 65A and 65B.

Between central support beams 52B and 52C in the tapered regions 65A and 65B, the lift engagement support plate 60 is welded or fastened by other means to the central part 68 of both support beams 52B and 52C. Additionally, a lift support plate 78 is also secured to the support beams 52B and 52C and extends substantially parallel to lift engagement support plate 60. A first lift support slat 80 and a second lift support slat 82 structurally reinforce the boxlike arrangement of lift engagement support plate 60 and lift support plate 78. By this construction, the lift engagement support plate 60, which runs substantially parallel to the central support plate 54, is structurally reinforced so that the entire structure may be lifted or positioned by a fork lift or the like by engaging the lift engagement support plate 60. The length of lift engagement support plate 60 is such that support plate 60 extends a substantial distance in order to ensure that a lift member, associated with a fork lift or the like, will not extend further than support plate 60 extends.

The area of the tapered regions 65A and 65B, on each end of the tractor trailer bridge assembly B, are covered by the first angled supported plate 56 and second angled supported plate 8. Plates 56 and 58 rest on the angle sections 74 and 76 of each of the support beams 52A through 52D. In this way, each of the angled support plates 56 and 58 extend from respective lines 84A and 84B, where the respective support plates join the central supported plate 54, to the regions proximate respective ends of the base plate 50.

At least one of the angled support plates 56 and 58 defines a plurality, preferably two lift openings. For example, as seen in FIG. 2 there is provided a first lift opening 86 and a second lift opening 88. First lift opening 86 corresponds roughly to the space 90 which is defined by a portion of beam support member 52B, a portion of the lift engagement support plate 60, a portion of the lift support plate 78 and the first lift support slat 80. In a similar fashion, second lift opening 88 roughly corresponds to a second area 92 which is defined by a portion of the support beam 52C a portion of the lift engagement support plate 60, a portion of the lift support plate 78 and the second lift support slat 82.

Second angled supported plate 58 may also be provided with lift openings so that the bridge assembly may be lifted and maneuvered by engaging the lift openings at either end of the bridge assembly. Additionally, a lift engagement support plate and lift support slats may also be provided adjacent the second end 64.

OPERATION

In operation, a fork lift (not shown) may be positioned so that respective fork portions, associated with the fork lift, enter openings 86 and 88 respectively. The bridge B may then be lifted and positioned within a truck trailor 10, as shown in FIG. 1. A coil C1 may then be transported over region 40 and placed above second supported area 28. In this manner bridge B acts as a reinforcing member as the load is positioned.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention of the limits of the appended claims.

What is claimed is:

1. A truck trailer bridge assembly for use with a truck trailer having a first area directly supported by at least one axle and a second area directly supported by at least one axle, the bridge assembly comprising:
    (a) a base portion having a first end and a second end, and a first side and a second side, the distance between said first end and said second end being substantially equal to the distance between the first area of the truck trailer directly supported by at least one axle and the second area of the truck trailer directly supported by at least one axle;

(b) a plurality of support beams generally extending from proximate said base portion first end to proximate said base portion second end and including a first and second central support beam;

(c) a central supported plate having a length smaller than said base portion;

(d) a first end angled support plate extending from proximate said base portion first end to a line at which said first end angled supported plate joins said central supported plate, said first end angled supported plate defining a plurality of lift openings;

(e) a second end angled supported plate extending from proximate said base portion second end to a line at which said second end angled supported plate joins the central supported plate;, (f) lift engagement support plate positioned between said central support plate and said base portion and extending intermediate said first and said second central support beam and secured thereto; and (g) said lift opening having a portion extending below said lift engagement support plate.

2. A truck trailer bridge assembly according to claim 1, wherein:

(a) said second end angled supported plate defines a plurality of lift openings.

3. A truck trailer bridge assembly according to claim 2, wherein:

(a) said plurality of lift openings associated with said first end angled supported plate corresponds generally to an area defined by said lift engagement support plate, said lift support plate, said first central support beam and said second central support beam; and, (b) said lift openings associated with said second end angled supported plate correspond generally to an area defined by said lift engagement support plate, said lift support plate, said first central support beam and said second central support beam.

4. A truck trailer bridge assembly for use with a truck trailer having a first area directly supported by at least one axle and a second area directly supported by at least one axle, the bridge assembly comprising:

(a) a base portion having a first end and a second end, and a first side and a second side, the distance between said first end and said second end being substantially equal to the distance between the first area of the truck trailer directly supported by at least one axle and the second area of the truck trailer directly supported by at least one axle, (b) a plurality of support beams generally extending from proximate said base portion first end to proximate said base portion second end and including a first and second central support beam;

(c) a central supported plate having a length smaller than said base portion;

(d) a first end angled support plate extending from proximate said base portion first end to a line at which said first end angled supported plate joins said central supported plate, said first end angled supported plate defining a plurality of lift openings;

(e) a second end angled supported plate extending from proximate said base portion second end to a line at which said second end angled supported plate joins the central supported plate; and, (f) lift engagement support plate, substantially parallel to said central supported plate and extending intermediate said first and said second central support beam and secured thereto, (g) a lift support plate substantially parallel to said lift engagement support plate and extending intermediate said first and said second central support beam and secured thereto;

(h) a first lift support slat extending between said lift engagement support plate and said lift support plate; and, (i) a second lift support slat extending between said lift engagement support plate and said lift support plate and being substantially parallel to said first lift support slat.

5. A truck trailer bridge assembly according to claim 4, wherein:

6. A truck trailer bridge assembly according to claim 5, wherein:

(a) said I beam sectin corresponds to the length of said central supported plate.

7. A truck trailer bridge asembly according to claim 6, wherein:

(a) the portion of said support beams which are not I beam sections include T sections having a face abutting the base plate thereby forming a continuous surface which abuts the base plate substantially the entire distance from the base plate first end to the base plate second end.

8. A truck trailer assembly according to claim 7, further comprising:

(a) a plurality of angle members each angle member having one face abutting one of said angled supported plate and a second end abutting a portion of one of said support beams.

9. A truck trailer bridge assembly according to claim 8, wherein:

(a) the portions of each of said support beams, which is abutted by an angle member, is tapered from proximate said central supported plate to proximate said base plate.

10. A truck trailer according to claim 4, wherein:

(a) said lift engagement support plate extends a substantial distance toward said base portion second end.

* * * * *